July 4, 1944.    N. B. NEWTON    2,352,799
INTERNALLY INSULATED VALVE
Filed Nov. 5, 1942
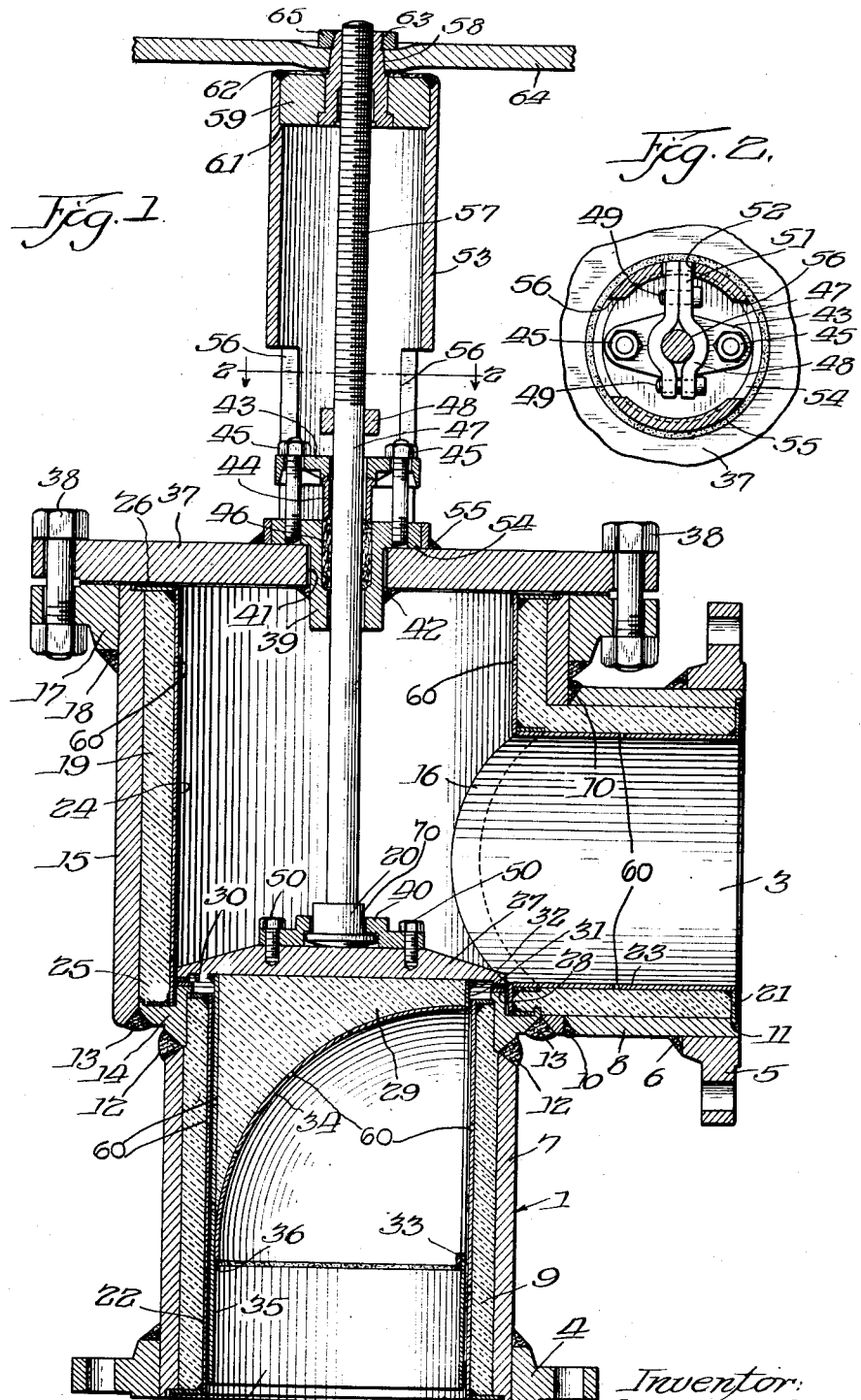
Inventor:
Norman B. Newton
By Joseph O. Large, Atty.

Patented July 4, 1944

2,352,799

UNITED STATES PATENT OFFICE 2,352,799

INTERNALLY INSULATED VALVE

Norman B. Newton, Chicago, Ill., assignor to Crane Co., Chicago, Ill., a corporation of Illinois Application November 5, 1942, Serial No. 464,680

6 Claims. (Cl. 251—156)

This invention relates generally to valves and more particularly pertains to an internally insulated valve suitable for service on extremely high temperatures, as for example in excess of 1200° F., whereby the valve casing and trimmings, such as the closure member and seat, may be suitably protected directly against such relatively high temperatures.

It has long been a problem in the valve and fitting industry to provide a valve in which proper insulation suitably protected might be arranged for within the interior of a valve casing so that such valve structure would be practical for use on relatively high temperature service. Various methods have been suggested from time to time, as for example those employing an internal lining with refractory cement, but actual service trials have indicated that such materials eroded very rapidly even when exposed to relatively low velocity flow.

In consideration of the foregoing, it is evident that in addition to the valve insulating problems present, there are other factors which influence the design of this type of valve. The normal service conditions frequently involve extremely high velocities in high temperature steam and other fluids with the consequent necessity therefore for also providing a construction contributing to low pressure drop. In view of the high velocity condition encountered, metal seating surfaces in a valve of this type have been deemed desirable in order to resist erosion.

Accordingly it is an important purpose of this invention to provide a valve preferably having metal-to-metal seating surfaces in which the non-turning closure member is provided with a streamlined, insulated guide construction below the said closure member thereby reducing pressure drop and minimizing objectionable vibration in the closure member during normal valve operation. The latter arrangement of insulation is preferably covered interiorly by means of a metal lining normally in contact with line fluids passing through the valve.

It has also been found that the metal lining arrangement of my invention lends itself well to the guiding and protection of the closure member and the insulating material used may possess the highest efficiency values as present, for example, in loose or blanket form rock wool, glass wool or exfoliated vermiculite (mica). Thus it may be said generally that all insulation installed in the manner hereinafter described and subject to the service conditions above referred to requires protection. It is therefore a prime purpose of this invention to provide the most practicable method of applying such means of protection to such insulation.

Other important advantages of my protective liner arrangement within a valve casing will become apparent upon proceeding with the following specification read in light of the patent drawing, in which Fig. 1 is a vertical sectional assembly view of the valve embodying my invention.

Fig. 2 is a sectional view taken on the line 2—2 of Fig. 1.

Referring now to Fig. 1, the fabricated valve body or casing is generally designated 1 and is provided with the usual inlet 2 and the outlet 3 having the connecting flanges 4 and 5 welded, as indicated at 6, to the tubular neck portions 7 of the inlet and 8 of the outlet respectively. The neck portions 7 and 8 are preferably made tubular in order to accommodate the more easily applied tubular or cylindrical arrangement of insulation 9 and 11 which fits closely within the respective ports constituting the inlet and the outlet. In addition, the respective welded connections at 12 and 13 connecting these neck portions are made relatively more easily in view of their being of annular form. As a further novel element of my invention, the seat portion of the valve, as designated at 14, constitutes the connecting means or coupling for the inlet and the main body portions. Thus it is preferable that the peripheral portion of the body seat ring 14 serve as the connecting means for the upper cylindrical portion 15 of the casing. The latter member, while similar to the neck portions 7 and 8 in being of tubular cross-section, is provided with the side outlet aperture as indicated at 16, communicating with the port 3. At the upper end portion of the cylindrical member 15, a suitable bonnet flange 17 is attached by means of the annular weld 18. Thus it will be apparent that in view of the regularity of surface provided in the interior of the casing 15 it can also be easily lined with the desired insulating element 19 in whatever reasonable form selected.

As previously mentioned, under most service conditions it is not practical to simply line the casing 15 and the neck portions 7 and 8 with the insulating medium alone, in view of the objectionable erosion normally occurring due to the high velocity flow of fluids within the pipe line and through the valve. Therefore it has been found desirable to provide such insulating medium with the end-positioned metal rings 21 weld attached to the cylindrical metal sections 22 and 23 respectively, lining the interior of the ports 2 and 3, the vertically extending cylindrical section 15 having the metal lining 24 to protect the insulating element 19 against actual contact with the line fluid being carried. Both ends of the latter element are suitably protected similarly against such contact by means of the metal rings 25 and 26 respectively located at bottom and top of the cylindrical section 15. Thus it will be apparent that by assembly of the respective neck portions 7 and 8 with the upper portion 15; a complete angle type casing or valve body is defined, the neck portion 7 being annularly connected to the seat 14 and the portion 8 being assembled to the portion 15 by the weld means 10.

For controlling the flow through such casing it has been found preferable to employ a metallic seat closure member, and for this purpose a valve closure 27 is used, contacting in the closed position of the valve, as shown, upon the plain metal seat 28 which is preferably, but not necessarily, made integral with the seat ring 14. Thus for effecting valve tightness a conventional metal-to-metal seat contact is maintained. However, as a further safeguard in the handling of fluids at extremely high temperatures the closure member 27 is provided with the depending insulating element 29 which is attached to the lower surface portion 30 of the closure member 27 by means of the metal liner 31 and preferably weldably attached, as at 32, to the lower surface portion, as indicated. The cylindrically formed liner 31 is formed with an apertured portion 33, as indicated, communicating with the opening 16 of the valve casing when the valve is in its open position and through which the passage of fluid occurs under the normal urge of line flow.

The inner extension of the aperture 33 is formed by means of the curvilinear metal liner portion 34 to thereby direct or streamline the flow through the valve casing. Thus the inner surface portion of the liner 31, as indicated at 35, is attached by means of the annular weld connection 36 to the liner 31. In this manner it is apparent that all of the exposed surfaces of the respective insulating elements of both the casing as well as the closure member are closed and protected from the erosive effects of high temperature line flow moving under high velocity.

In order that line pressure may be evenly balanced, the walls of the respective protecting liners 22, 23, 24, 31, and 34 are provided with the small apertures 60, thus enabling line pressure to be exerted on both sides of the liners. The upper portion of the casing 1 is enclosed in the conventional manner by means of the bonnet flange 37 having suitable bolted connections, as indicated at 38, to form a pressure tight joint with the welded flange 17. In order to accommodate the stuffing box structure 39, the cover flange 37 is provided with the apertured portion 41 thereby permitting the insertion and mounting of the lower part of the stuffing box 39 in the manner indicated. The stuffing box 39 is preferably welded to the flange 37 by means of the annularly extending weld seal 42. The usual stuffing box flange 43 with the gland 44 and the gland bolts and nuts 45 are provided for the purpose of compressing the packing 46.

The stem 47 is preferably of the rising, non-rotatable type and, as shown more clearly in Fig. 2, is held against rotation by means of the clamp 48 employing the set screw 49 and the extension 51, the latter member engaging the slotted portion 52 of the outer casing bonnet 53 thereby inhibiting stem rotation. As indicated at 54, the cylindrical bonnet member 53 is supported and weldably secured thereto by means of the annular weld 55 conveniently applied to an upper surface of the flange 37 as shown.

In order to provide for the usual adjustment of the stuffing box in compressing the packing 46, the cylindrical member 53 is diametrically apertured, as at 56, to allow for easy access to the bolts 45. At the upper portion of the valve stem 47 the conventional actuating threads 57 are provided for journally mounting within the rotatable yoke sleeve 58 mounted within the supporting member 59. The latter member is fixedly supported upon the shoulder portion 61 of the bonnet 53 by means of the annular weld 62. In arranging for the stem and disc connection, the lower portion of the stem 47 is provided with the stem head 20 engaging the disc stem ring 40, as indicated, the latter member being connected to the closure member 27 by means of the cap screws 50. The connection thus provided is relatively loose, but the closure member is held non-rotatable relative to the stem 47 by the simple expedient of applying a flattened portion to the disc stem ring 40 and the stem head 20, as indicated at 70. The upper portion of the yoke sleeve 58 is provided with the usual connection for a valve actuating means, as at 63, such as a handwheel 64 and the wheel nut 65. Obviously, other means suitable for either manual or motor operation may be provided, if desired.

Throughout the description, reference has been made to the inlet and outlet of the valve casing. It is obvious, of course, that their positions relative to the casing are interchangeable, depending upon the kind of service for which the valve is intended. While reference has been made to the use of an angle valve, it should be apparent that under certain conditions other types of valves may be used, without departing from the spirit of this invention.

Thus while a single form of the invention has been illustrated and described it is obvious that those skilled in the art may vary the details of construction as well as the precise arrangement of parts without departing from the spirit of the invention. Therefore it is not the desire to be limited to the above disclosure except as may be required by the appended claims, considering the state of the prior art.

I claim:

1. In a valve comprising a valve casing, a closure member therefor, the interior of the said casing and a portion of the said closure member being lined with an insulating element having an outer protective liner, said liner of said closure member being weldably secured to the said closure member to retain the said insulating element.

2. In a valve comprising a valve casing, a closure member therefor, the interior of the said casing and a portion of said closure member being lined by an insulating element, the latter element having an outer protective liner, the said liner having an extension serving as a guide for the said closure member in its opening and closing movements within the said casing.

3. In a valve comprising a valve casing, a closure member therefor, the interior of the said casing and a portion of the said closure member being lined by insulating elements, an outer protective liner for the said insulating elements, the insulating elements of the said valve casing having transversely extending annular liners for the end portions of the said insulating elements.

4. In a weld fabricated valve comprising a valve casing, a closure member therefor, a valve seat, the said casing comprising a plurality of tubular sections connected adjacent to the valve seat, the interior of the said sections and a portion of the said closure member being lined by an insulating element having a metal liner, the said metal liner of the casing including transversely extending end portions permitting the removal from the casing of the said insulating element with the said liner.

5. In an angle valve comprising a valve casing having an inlet and an outlet, a closure member therefor, the interior of the said casing and a portion of the said closure member being provided with an insulating element having an outer protective liner portion, the said liner portion functioning as a guide means for the said closure member to divert the flow from the said closure member into the said outlet.

6. In a valve comprising a valve casing, a closure member therefor, the interior of the said casing and a portion of the said closure member being provided with an insulating element, an outer protective liner for protecting the insulating element of the said casing and the said closure member respectively, the said liner being in direct contact with line fluids passing through the said casing.

NORMAN B. NEWTON.